June 3, 1969 P. L. CONANT, SR 3,448,396

ELECTRONIC CIRCUIT-DIRECT COUPLED TOTEM POLE EMITTER FOLLOWER

Filed Dec. 21, 1966

INVENTOR.
PAUL L. CONANT SR.
BY Hoody & Hallacher
ATTORNEYS

United States Patent Office 3,448,396

Patented June 3, 1969

3,448,396

ELECTRONIC CIRCUIT-DIRECT COUPLED TOTEM POLE EMITTER FOLLOWER

Paul L. Conant, Sr., Richardson, Tex., assignor to Collins Radio Company, Cedar Rapids, Iowa, a corporation of Iowa Filed Dec. 21, 1966, Ser. No. 603,565
Int. Cl. H03f *3/42, 3/04, 3/68*
U.S. Cl. 330—24 5 Claims

ABSTRACT OF THE DISCLOSURE

A totem pole emitter follower utilizes a single input transistor and two amplifying transistors to feed back the emitter signal and the input transistor and thereby achieve increased amplification and frequency stability of the circuit. A voltage limiting device is included to limit the voltage excursion of the output signal.

This invention relates generally to a class of transistorized circuits called emitter followers and particularly to a class of circuits called totem pole emitter followers.

The characteristics and operation of emitter followers are well-known in the art. These circuits have a variety of beneficial uses and are important in electronic equipment. These circuits are characterized as having high input impedance, low output impedance, and substantial power amplification. However, they suffer the inherent disadvantages of being unable to function at low frequencies, and particularly at DC, due to loss of voltage amplification, loss of power amplification, increase phase shift, etc. These disadvantages have been a pressing problem with emitter followers and has remained unsolved heretofore. It is therefore an object of this invention to provide a totem pole emitter follower which exhibits uniform performance of voltage amplification, power amplification, phase shift, etc. at all frequencies, including low frequency and DC.

It is another object of this invention to provide such a circuit which has increased input impedance and decreased output impedance.

It is another object of this invention to provide a circuit which exhibits higher voltage amplification at its output circuitry than can be ordinarily obtained with emitter followers.

Further objects, features, and advantages of the invention will become apparent from the following description and claims when read in view of the accompanying drawing in which:

Figure 1:
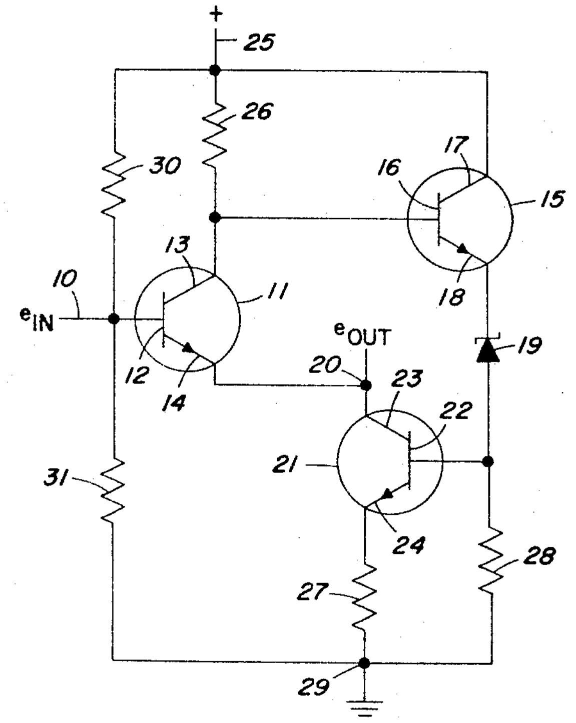
FIGURE 1 is one circuit embodiment of the invention.
Figure 2:
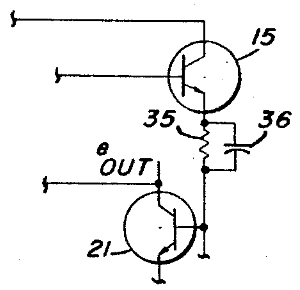
FIGURE 2 is a portion of the circuit of FIGURE 1 and illustrates an alternative embodiment.

Like elements in FIGURES 1 and 2 have the same reference numerals.

FIGURE 1 shows the circuit connection of the totem pole emitter follower which constitutes this invention. An input signal is applied to an input terminal 10 which is connected to the base 12 of transistor 11. The emitter 14 of transistor 11 is connected to an output terminal 20. The collector 13 of transistor 11 is connected to the base 16 of a second transistor 15. The emitter 18 of transistor 15 is connected to the base 22 of a third transistor 21 through a Zener diode 19. The Zener diode 19 can be replaced with a resistance-capacitance parallel network for operations above the DC level as shown by resistor 35 and capacitor 36 in FIGURE 2. The collector 23 of transistor 21 is also coupled to output terminal 20. A biasing voltage 25 is applied to the base 12 of transistor 11 through a resistor 30. This biasing voltage is also applied to the collector 17 of transistor 15 and to the base 16 of transistor 15 and collector 13 of transistor 11 through a second resistor 26. The base and emitter of transistor 21 are grounded through resistors 28 and 27 respectively.

In operation a signal is applied to the base of transistor 11. This signal is power amplified at the emitter 14 and is voltage amplified at collector 13. The signal present at emitter 14 is in phase with the input signal while the signal present at collector 13 is 180° out of phase with the input signal. The signal present at the collector 13 is applied to base 16 of transistor 15 and therefore is power amplified at emitter 18 of transistor 15. Zener diode 19 serves to couple this signal to base 22 of transistor 21. This signal is then voltage amplified to the collector 23 of transistor 22. This signal is 180° out of phase with the signal present on base 22 and therefore is in phase with the output signal present on emitter 14 of transistor 11. These signals therefore combine to give an increased power amplification at output terminal 20. Zener diode 19 limits the peak-to-peak voltage excursion on the output terminal 20. This is so because the Zener 19 controls the maximum input voltage applied to base 22 of transistor 21. Because the signal applied to output terminal 20 by transistor 21 has been amplified twice before being applied to said terminal it is the most significant signal present on the output terminal and therefore control of this signal controls the voltage excursion of the output signal. It should be noted that the biasing voltage 25 will be a positive voltage when NPN transistors are used and will be negative when PNP transistors are used. The circuit works equally well when either type of transistor is used.

The power gain of an emitter follower is exceeded by this invention because transistors 11, 15, and 21 combine to drive the circuit's output. The input impedance of this invention is increased due to the use of heavy voltage feedback from the collector of transistor 11, via transistor 15, to transistor 21 which is coupled at its collector to the emitter of transistor 11, both of which are common with the circuit's output. The output impedance of this invention is reduced as a result of the combined increase voltage gain and the increased power gain. The uniform frequency response down to and including DC inputs is obtained from the combined effects of transistors 11, 15, and 21, and the use of Zener diode 19.

Although this invention has been described as being a semiconductor configuration, it is not so limited in that all of its features are directly applicable to thermionic valve circuits, where transistors 11, 15 and 21 could be directly replaced with thermionic valves, and where Zener diode 19 could be directly replaced with a gas voltage reference diode, and thereby achieve the same unique attributes.

Although this invention has been described with respect to a particular embodiment thereof, it is not to be so limited as changes and modifications may be made therein which are within the spirit and scope of the invention as defined by the appended claims.

I claim:

1. An electronic amplifying circuit comprising: a first transistor having a plurality of electrodes; input means for coupling an input signal to a first of said electrodes; an output terminal connected to a second of said electrodes; a second transistor coupled to a third of said eelctrodes; and a signal level control means coupling said second transistor to said output terminal to limit the voltage excursion of the output voltage, said signal level control means including a voltage reference diode and a third transistor with said diode coupling said second and third transistors.

2. The circuit of claim 1 wherein said first, second and third electrodes of said first transistor are the base, emitter, and collector respectively, the base of said second transistor is coupled to the collector of said first transistor, said voltage reference diode is a Zener diode which is connected between the emitter of said second transistor and the base of said third transistor and said output terminal is coupled to the emitter of said first transistor and the collector of said third transistor.

3. The circuit of claim 2 including means for biasing said first and second transistors and means for connecting said third transistor and said Zener diode to ground.

4. The circuit of claim 3 wherein said biasing means is coupled to the collector of said second transistor and to the collector of said first transistor through a first resistor, the emitter of said third transistor is connected to ground through a second resistor, and said Zener diode is connected to ground through a third resistor.

5. An electronic amplifying circuit comprising: a first transistor having a plurality of electrodes; input means for coupling an input signal to a first of said electrodes; an output terminal connected to a second of said electrodes; a second transistor coupled to a third of said electrodes; a signal level control means coupling said second transistor to said output terminal to limit the voltage excursion of the output voltage, said signal level control means including a resistance-capacitance parallel network and a third transistor with said parallel network coupling said second and third transistors.

References Cited

UNITED STATES PATENTS 3,185,933 5/1965 Ehret ---------------- 330—18

ROY LAKE, *Primary Examiner.*

L. J. DAHL, *Assistant Examiner.*

U.S. Cl. X.R.

330—19